(12) United States Patent
Kim (10) Patent No.: US 11,110,770 B2
(45) Date of Patent: Sep. 7, 2021

(54) ELECTRONICALLY CONTROLLED SUSPENSION CONTROL SYSTEM OF VEHICLE USING ROAD SURFACE INFORMATION AND CONTROL METHOD USING THE SAME

(71) Applicants: Hyundai Motor Company, Seoul (KR); Kia Motors Corporation, Seoul (KR)

(72) Inventor: Hyung Jin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 256 days.

(21) Appl. No.: 16/395,575

(22) Filed: Apr. 26, 2019

(65) Prior Publication Data

US 2019/0344634 A1 Nov. 14, 2019

(30) Foreign Application Priority Data

May 8, 2018 (KR) ........................ 10-2018-0052268

(51) Int. Cl.
*B60G 17/0165* (2006.01)
*B60G 17/019* (2006.01)
*B60G 17/018* (2006.01)

(52) U.S. Cl.
CPC ....... *B60G 17/0165* (2013.01); *B60G 17/018* (2013.01); *B60G 17/019* (2013.01); *B60G 2400/0522* (2013.01); *B60G 2400/0523* (2013.01); *B60G 2400/10* (2013.01); *B60G 2400/204* (2013.01); *B60G 2400/37* (2013.01);

(Continued)

(58) Field of Classification Search
None
See application file for complete search history.

(56) References Cited

U.S. PATENT DOCUMENTS 8,762,000 B2 6/2014 Schindler et al.
10,486,485 B1 * 11/2019 Levinson ........... B60G 17/0165
(Continued)

FOREIGN PATENT DOCUMENTS

KR 10-2013-0003901 A 1/2013

*Primary Examiner* — Dale W Hilgendorf
*Assistant Examiner* — Alexander C. Bost
(74) *Attorney, Agent, or Firm* — Morgan, Lewis & Bockius LLP (57) ABSTRACT

An electronically controlled suspension control system of a vehicle using road surface information may include a road surface recognition unit of recognizing a road surface, a road surface profile determination unit of determining a road surface profile using information as to the recognized road surface, a behavior estimation and determination unit of estimating and determining a vehicle behavior according to the determined road surface profile, a behavior information recording unit storing information as to the behavior of the vehicle, an electronically controlled suspension (ECS) control unit of controlling a suspension of the vehicle, and a behavior determination and control unit of comparing a determined value from the behavior estimation and determination unit with recorded values of the behavior information recording unit, determining a behavior level of the vehicle, based on results of the comparison, and sending a control command according to the determined behavior level to the ECS control unit.

21 Claims, 6 Drawing Sheets

(52) U.S. Cl.
CPC .... *B60G 2400/41* (2013.01); *B60G 2400/821* (2013.01); *B60G 2400/823* (2013.01); *B60G 2400/90* (2013.01); *B60G 2401/142* (2013.01); *B60G 2600/182* (2013.01); *B60G 2800/162* (2013.01); *B60G 2800/916* (2013.01)

(56) References Cited

U.S. PATENT DOCUMENTS

| | | | | |
|---|---|---|---|---|
| 2008/0234900 | A1* | 9/2008 | Bennett | B60G 17/019 701/48 |
| 2012/0046829 | A1* | 2/2012 | Ogawa | B60G 17/08 701/37 |
| 2015/0202939 | A1* | 7/2015 | Stettner | G01S 17/86 701/37 |
| 2015/0331113 | A1* | 11/2015 | Stettner | G01S 17/931 701/37 |
| 2016/0034771 | A1* | 2/2016 | Schamp | B60G 17/019 348/148 |
| 2016/0347143 | A1* | 12/2016 | Hrovat | B60W 30/095 |
| 2017/0137023 | A1* | 5/2017 | Anderson | B60W 50/14 |
| 2017/0326937 | A1* | 11/2017 | Miska | B60G 17/08 |
| 2018/0194286 | A1* | 7/2018 | Stein | G06K 9/00791 |
| 2019/0023095 | A1* | 1/2019 | Ficca | B60W 20/15 |
| 2020/0023705 | A1* | 1/2020 | Hirao | B60G 17/0165 |

* cited by examiner

(Vehicle Speed: 30 kph)

|   | Speed Bump Profile | | 1st Peak | |
|---|---|---|---|---|
|   | Height (cm) | Length (m) | Impulse (g) | Pitch Rate (mm/s) |
| 1 | 10 | 3.6 | | |
| 2 | 7.5 | 3.6 | | |
| 3 | 10 | 2.6 | | |
| 4 | 7.5 | 2.6 | | |
| 5 | 7.5 | 1 | | |
| 6 | 5.625 | 1 | | |

ELECTRONICALLY CONTROLLED SUSPENSION CONTROL SYSTEM OF VEHICLE USING ROAD SURFACE INFORMATION AND CONTROL METHOD USING THE SAME

The present application claims priority to Korean Patent Application No. 10-2018-0052268, filed on May 8, 2018, the entire contents of which is incorporated herein for all purposes by this reference.

BACKGROUND OF THE INVENTION

Field of the Invention

The present invention relates to a vehicle, and more particularly to an electronically controlled suspension.

Description of Related Art

Generally, when a vehicle drives on a road having rough road surface conditions such as speed bumps, unpaved road surfaces, or pot-holes, accidents may occur due to scratching of the bottom surface of the vehicle, impact, vibration or the like.

A suspension is disposed in a vehicle such that the suspension is connected to a vehicle axle. The suspension is a device configured for controlling vibration or impact received from a road surface during travel of a vehicle to prevent the vibration or impact from being directly transferred to a vehicle body, achieving prevention of damage to the vehicle body, passengers, and freight while providing enhanced ride comfort.

Such a suspension may include a chassis spring for reducing an impact received from a road surface, a shock absorber for controlling free vibration of the chassis spring, enhancing ride comfort, and a stabilizer bar for preventing body roll of a vehicle.

Meanwhile, an electronically controlled suspension (ECS) configured for automatically controlling strength thereof in accordance with vehicle driving conditions or road surface conditions has recently been provided.

Such an ECS may detect driving condition information such as vehicle speed, steer angle, and vertical acceleration of a vehicle body and road surface information, through various sensors, and may automatically control, in an electronically controlled manner, the spring rate of the suspension, the attenuation force of the shock absorber, the posture of the vehicle body, the vehicle height, etc. in accordance with road surface conditions.

ECSs may be categorized into an active suspension configured to control motion of a vehicle body by applying external energy to the suspension using an actuator and a semi-active suspension configured to control attenuation force thereof using an actuator as an auxiliary spring.

However, conventional ECSs directly perform suspension control in accordance with road surface conditions when a vehicle contacts a road surface. For this reason, such conventional ECSs may have difficulty in rapidly and stably coping with impulse and pitch rate, to which the vehicle is directly subjected, through previous estimation of the impact level and the pitch rate.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an electronically controlled suspension control system of a vehicle using road surface information and a control method using the same that substantially obviate one or more problems due to limitations and disadvantages of the related art.

Various aspects of the present invention are directed to providing an electronically controlled suspension control system of a vehicle using road surface information and a control method using the same, which are configured for rapidly and stably performing suspension control by previously checking road conditions in front of the vehicle, and estimating impulse, pitch rate, etc., to which the vehicle is subjected.

Additional advantages, objects, and features of the exemplary embodiments will be set forth in part in the description which follows and in part will become apparent to those having ordinary skill in the art upon examination of the following or may be learned from practice of the embodiments. The objectives and other advantages of the exemplary embodiments may be realized and attained by the structure particularly pointed out in the written description and claims hereof as well as the appended drawings.

To achieve these objects and other advantages and in accordance for the embodiments, as embodied and broadly described herein, an electronically controlled suspension control system of a vehicle may include a road surface recognition unit of recognizing a road surface positioned in front of the vehicle, a road surface profile determination unit of determining a profile of the road surface using information as to the road surface recognized by the road surface recognition unit, a behavior estimation and determination unit of estimating and determining a value of behavior of the vehicle according to the profile of the road surface determined by the road surface profile determination unit, a behavior information recording unit storing information as to the behavior of the vehicle, an electronically controlled suspension (ECS) control unit of controlling a suspension of the vehicle, and a behavior determination and control unit of comparing a determined value from the behavior estimation and determination unit with recorded values of the behavior information recording unit, determining a behavior level of the vehicle, based on results of the comparison, and sending a control command according to the determined behavior level to the ECS control unit.

The road surface recognition unit may include at least one of a camera and a navigation terminal.

The road recognition unit may recognize heights, lengths and curvatures of a speed bump and a pot-hole disposed at the road surface, a height of the road surface, a length of the road surface, and a curvature of the road surface.

The road surface profile determination unit may determine the profile of the road surface, based on the length of the speed bump and the height of the speed bump.

The behavior estimation and determination unit may estimate the behavior of the vehicle, based on at least one of an impulse, a bounce rate, a pitch rate, and a yaw rate.

The behavior estimation and determination unit may determine the impulse and the pitch rate in accordance with the profile of the road surface, estimating the behavior of the vehicle.

The behavior estimation and determination unit may estimate the behavior of the vehicle, based on at least one of a first peak value, a maximum peak value, a minimum peak value, and a difference value between the maximum peak value and the minimum peak value in each of the impulse and the pitch rate.

The first peak value may be used for control of the first impulse. The maximum peak value may be used for reduction control of a maximum impulse. The difference value may be used for entire behavior control.

The behavior information recording unit may store impulses and pitch rates according to different vehicle speeds through real vehicle experiments or simulations, in association with expected vehicle behaviors according to predetermined kinds of speed bumps.

The behavior information recording unit may determine an impulse and a pitch rate associated with an unknown speed bump different from the predetermined kinds of speed bumps, using at least one of numerical determination and interpolation.

The behavior determination and control unit may divide the behavior level of the vehicle into a plurality of behavior levels.

The behavior level of the vehicle may be determined in accordance with a plurality of impulse level ranges and a plurality of pitch rate level ranges.

The electronically controlled suspension control system may further include a vehicle signal determination unit of determining vehicle signal information, and sending the determined vehicle signal information to the ECS control unit. The behavior determination and control unit may determine that a control may be executed, based on a result value from the vehicle signal determination unit, when there is no road surface recognized by the road surface recognition unit.

The ECS control unit may have a plurality of control parameters respectively corresponding to result values of the behavior determination and control unit.

The ECS control unit may have control parameters respectively corresponding to result values of the vehicle signal determination unit.

In another aspect of the present invention, a method for controlling an electronically controlled suspension control system of a vehicle may include road surface recognition for recognizing a road surface positioned in front of the vehicle, road surface profile determination for determining a profile of the road surface, using information as to the road surface recognized in the road surface recognition, vehicle behavior estimation for estimating a behavior of the vehicle according to the profile of the road surface determined in the road surface profile determination, behavior comparison for comparing an estimated value obtained in the vehicle behavior estimation with recorded values in a behavior information recording unit, and behavior determination and control for determining a behavior level of the vehicle, based on results of the behavior comparison, and sending a control command according to the determined behavior level.

The behavior comparison may seek an estimation value similar to one of the recorded values, and may determine a reference vehicle behavior, based on the estimation value.

The behavior determination and control may control a suspension of the vehicle through application of a control parameter meeting the reference vehicle behavior.

The vehicle behavior level may be categorized into a plurality of behavior levels. The control command may include a plurality of control parameters respectively according to the plurality of behavior levels.

The method may further include coordinator operation executed after the behavior determination and control, to determine an order of control preference according to a result value of the behavior determination and control.

The coordinator operation may preferentially execute a control according to the behavior determination and control when there is a road surface recognized in the road surface recognition.

The coordinator operation may execute an electronically controlled suspension (ECS) control when there is no road surface recognized in the road surface recognition.

In accordance with the ECS control system of the vehicle using road surface information according to an exemplary embodiment of the present invention, it may be possible to achieve road surface recognition through the road surface recognition unit, which may recognize the height of a road surface positioned in front thereof, to determine a behavior of the vehicle as an expected vehicle behavior according to the recognized front road surface, and to previously control the suspension using a parameter suitable for the expected vehicle behavior. Accordingly, effects of vehicle motion reduction and impact reduction may be obtained.

It is to be understood that both the foregoing general description and the following detailed description of the present invention are exemplary and explanatory and are intended to provide further explanation of the present invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments will be apparent, referring to the annexed drawings and a description provided of the embodiments. In the following description of the embodiments, it will be understood that, when an element such as a layer (film), region, pattern, or structure is referred to as being "on" or "under" another element, it can be directly on or under another element or can be indirectly formed such that an intervening element is also present. Furthermore, terms such as "on" or "under" may be understood on the basis of the drawings.

In the drawings, dimensions of layers are exaggerated, omitted, or schematically illustrated for clarity and convenience of description. Furthermore, dimensions of constituent elements do not entirely reflect actual dimensions thereof. The same reference numerals denote the same constituent elements. Hereinafter, embodiments will be described in detail with reference to the annexed drawings.

Figure 1:
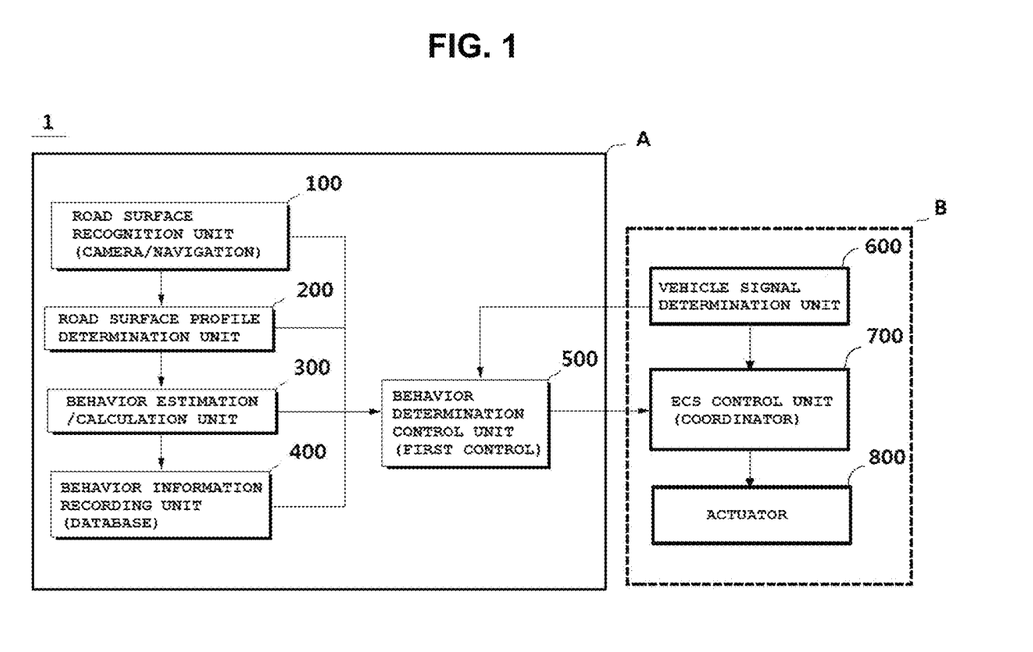
FIG. 1 is a block diagram illustrating a configuration of an electronically controlled suspension control system of a vehicle using road surface information according to an exemplary embodiment of the present invention.
Figure 2:
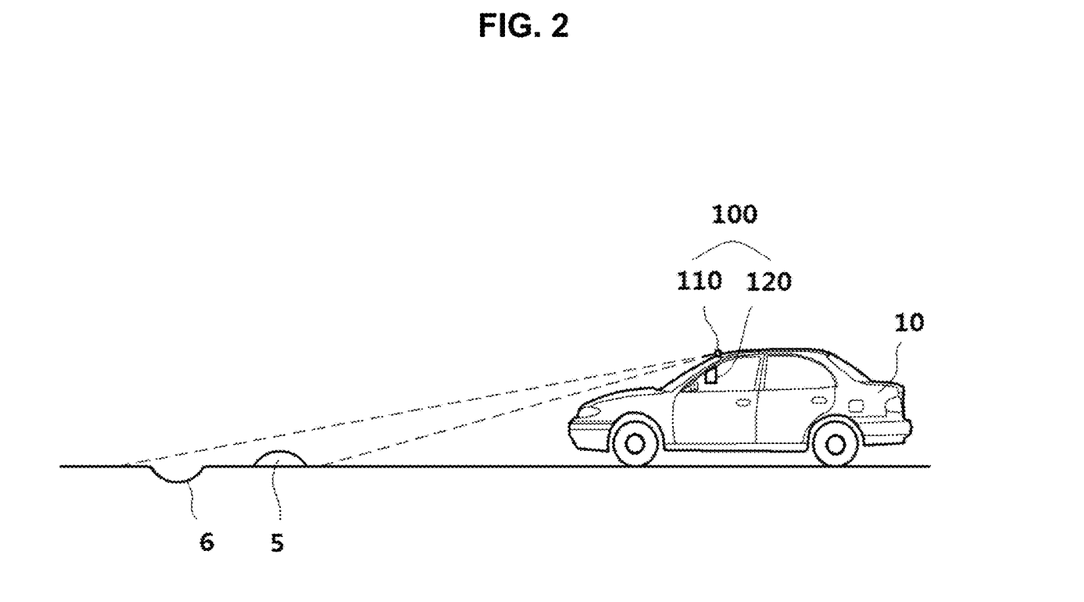
FIG. 2 is a schematic view exemplarily illustrating acquisition of road surface information in the vehicle through a road surface recognition unit.
Figure 3:
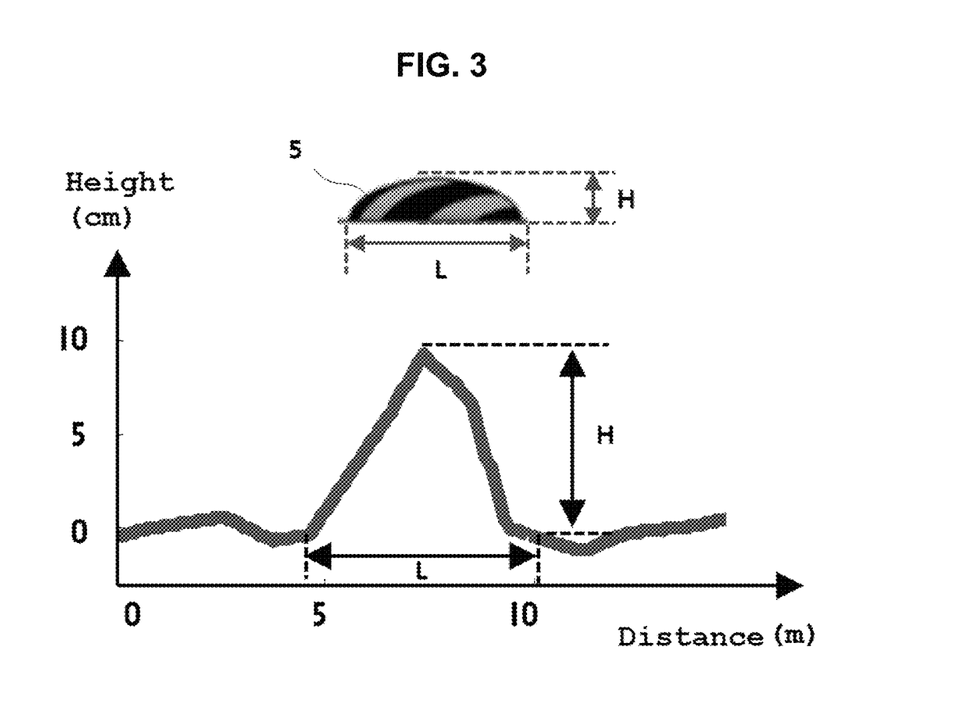
FIG. 3 is a graph depicting data as to a road surface profile determined in accordance with road surface recognition.

FIG. 1 is a block diagram illustrating a configuration of an electronically controlled suspension control system of a vehicle using road surface information according to an exemplary embodiment of the present invention. FIG. 2 is a schematic view exemplarily illustrating acquisition of road surface information in the vehicle through a road surface recognition unit. FIG. 3 is a graph depicting data as to a road surface profile determined in accordance with road surface recognition.

As illustrated in FIG. 1, the electronically controlled suspension control system according to the illustrated exemplary embodiment of the present invention, which is designated by reference numeral "1", includes constituent elements for executing a first control logic A and a second control logic B. For example, the electronically controlled suspension control system 1 may include a road surface recognition unit 100, a road surface profile determination unit 200, a behavior estimation and determination unit 300, a behavior information recording unit 400, a behavior determination and control unit 500, a vehicle signal determination unit 600, an electronically controlled suspension (ECS) control unit 700, and an actuator 800.

The road surface recognition unit 100 may be mounted to the vehicle, to recognize a road surface positioned in front of the vehicle. As illustrated in FIG. 2, the road surface recognition unit 100 may include at least one of a camera 110 and a navigation terminal 120, which are mounted to the vehicle. In FIG. 2, the vehicle is designated by reference numeral "10".

The camera 110 may be disposed at a top area of the vehicle 10, and may recognize a road surface positioned in front of the vehicle 10 by photographing the road surface. The navigation terminal 120 may recognize a road surface positioned in front of the vehicle 10 in accordance with road surface information as to, for example, speed bumps, curvatures or the like stored in map data.

For example, the camera 110 includes a camera configured for recognizing the height of a front road surface and then, may photograph a road surface positioned in front of the vehicle 10. Accordingly, the camera 110 may recognize traffic lanes, a speed bump 5, a pot-hole 6, etc. included in a road surface, as illustrated in FIG. 2. Furthermore, the camera 110 may identify a road surface and an object positioned in front of the vehicle 10, or may also recognize the distance between the vehicle 10 and a point on the road surface, the length and height of the object, the slope of the road surface, an expected trace of tires, etc.

The road surface profile determination unit 200 may concretely determine a profile of the road surface in accordance with information related to the road surface recognized through the road surface recognition unit 100. For example, the road surface profile determination unit 200 may previously determine the height, length, distance, curvature, etc. of the road surface including the speed bump 5 in accordance with information as to the length and height of the speed bump 5 acquired through the road surface recognition unit 100.

As depicted in the graph of FIG. 3, the road surface profile determination unit 200 may determine the profile of the speed bump 5 having a height H of 10 cm with reference to the road surface recognized through the road surface recognition unit 100 while being positioned in a section spaced forward of the vehicle 10 by a distance of 5 to 10 m.

The behavior estimation and determination unit 300 may estimate and determine various behaviors of the vehicle according to conditions of the road surface. For example, behaviors of the vehicle may include linear motion, understeer, over-steer, bounce, etc. on a road surface. Behaviors of the vehicle may also be exhibited in various other forms.

Behaviors of a vehicle may be represented by physical quantities such as impulse, pitch, roll, yaw, and the like. Impulse represents variation in momentum within a certain time, pitch represents a behavior of the vehicle moving in forward, rearward, upward and downward directions, roll represents a behavior of the vehicle moving left and right with reference to an advance direction of the vehicle, and yaw represents a behavior of the vehicle rotating left and right in a state of being horizontally maintained.

For example, when the vehicle travels on a road surface, on which the speed bump 5 is disposed, the vehicle may exhibit a behavior that wheel rates including impulse, bounce rate, pitch rate, yaw rate, etc., increase while traveling over the speed bump 5.

In connection with this, the behavior estimation and determination unit 300 may estimate a behavior of the vehicle traveling on the road surface determined by the road surface profile determination unit 200 by previously determining the behavior of the vehicle, based on the above-described physical quantities.

In the illustrated exemplary embodiment of the present invention, the behavior estimation and determination unit 300 will be described mainly in conjunction with the case in which impulse and pitch rate are determined as representative examples of physical quantities for vehicle behavior estimation and determination. However, physical quantities used for vehicle behavior estimation in an exemplary embodiment of the present invention are not limited to impulse and pitch rate. For example, bounce rate, yaw rate, etc. may be further included in the physical quantities.

As described above, the vehicle exhibits variations in impulse and pitch rate in accordance with road surface conditions while traveling on a road surface (for example, the speed bump 5). The behavior estimation and determination unit 300 may estimate a behavior of the vehicle traveling on the road surface by determining impulse and pitch rate of the vehicle.

For example, assuming that the speed bump 5 has a constant height of 10 cm (with reference to a vehicle speed of 30 kph), impulse of the vehicle exhibited in accordance with variation in the length (m) of the speed bump 5 may be derived through a function "y=ax+b" (y being impulse (g), x being a length (m), and a and b being constants).

In another example, assuming that the speed bump 5 has a constant length of 3.6 m (with reference to a vehicle speed of 30 kph), impulse of the vehicle exhibited in accordance with variation in the height (cm) of the speed bump 5 may be derived through a function "y=cx−d" (y being impulse (g), x being a height (cm), and c and d being constants).

The behavior estimation and determination unit 300 may estimate a dynamic behavior of the vehicle, based on at least one of determined results, that is, a first peak value 1st Peak, a maximum peak value Max Peak, a minimum peak value Min Peak, and a difference value between the maximum peak value and the minimum peak value, Peak to Peak, in each of the determined impulse and the determined pitch rate.

Figure 4A:
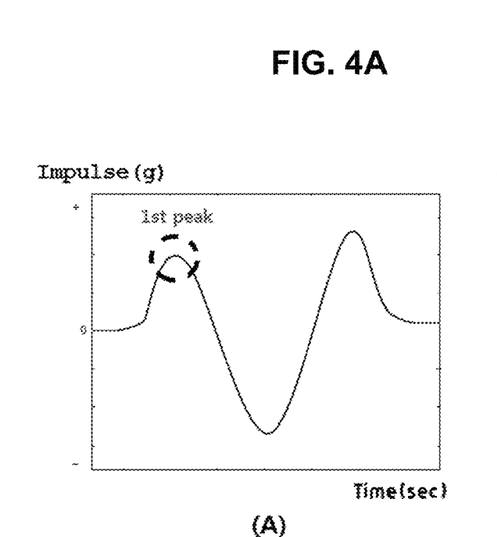
FIG. 4A and FIG. 4B illustrate, through a graph, results obtained by determining impulse and pitch rate for estimation of a behavior of the vehicle, based on one peak value.
Figure 4B:
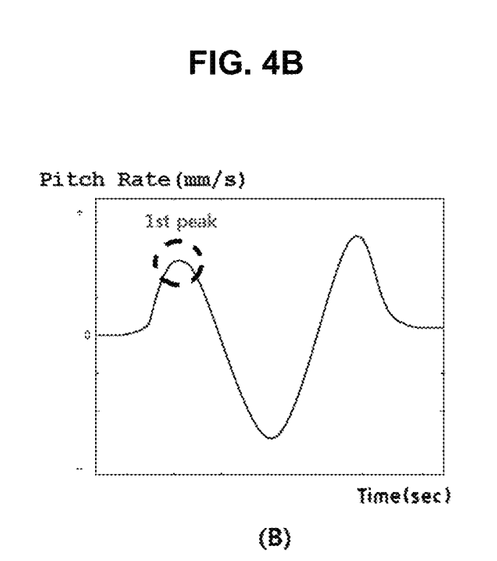
Figure 5A:
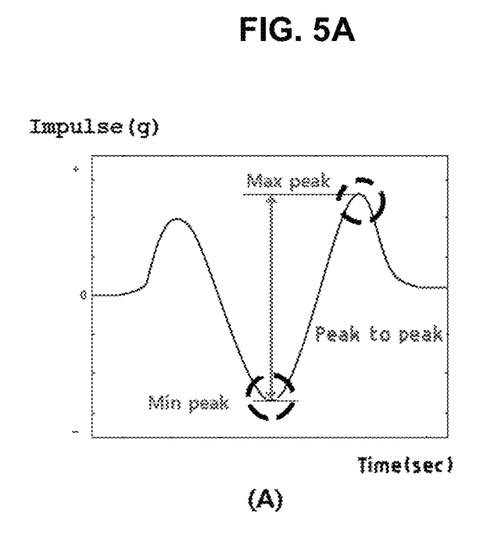
FIG. 5A and FIG. 5B depict, through a graph, results obtained by determining impulse and pitch rate for estimation of a behavior of the vehicle, based on ranges of peak values.
Figure 5B:
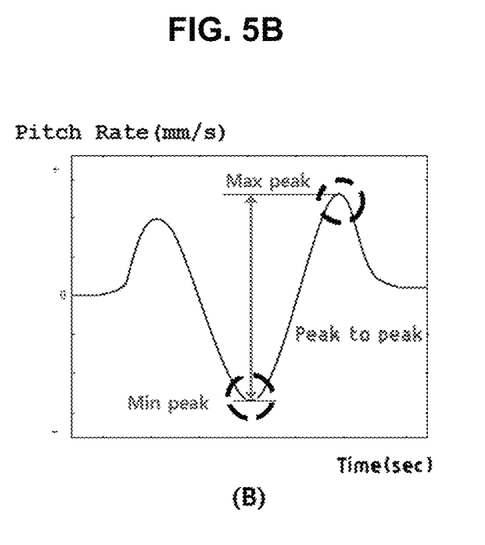

FIG. 4A and FIG. 4B illustrate, through a graph, results obtained by determining impulse and pitch rate for estimation of a behavior of the vehicle, based on one peak value. FIG. 5A and FIG. 5B depict, through a graph, results obtained by determining impulse and pitch rate for estimation of a behavior of the vehicle, based on ranges of peak values.

When the vehicle travels on a road surface including a speed bump 5, impulse and pitch rate of the vehicle depending on the speed of the vehicle and the height, length, distance, etc. of the speed bump 5 are varied with passage of time. The impulse and pitch rate variations may be observed through the form of data (a graph).

For example, referring to a correlation graph A between time and impulse and a correlation graph B between time and pitch rate, as shown in FIG. 4A and FIG. 4B, the behavior estimation and determination unit 300 may determine the impulse and pitch rate of the vehicle, based on one peak value (one peak point) in the impulse variation graph and one peak value (one peak point) in the pitch rate variation graph, respectively, to use determined results for a suitable control according to an expected behavior of the vehicle to travel over the speed bump 5.

The first peak value 1st Peak represents a point where impulse and pitch rate are first abruptly increased. The first peak value 1st Peak may be used mainly for first impulse control of the suspension. The maximum peak value Max Peak may be used mainly for a control for reduction of maximum impulse.

In another example, referring to a correlation graph A between time and impulse and a correlation graph B between time and pitch rate, as shown in FIG. 5A and FIG. 5B, the behavior estimation and determination unit 300 may determine the impulse and pitch rate of the vehicle, based on a difference value Peak to Peak between a maximum peak value Max Peak and a minimum peak value Min Peak in the impulse variation graph and a difference value Peak to Peak between a maximum peak value Max Peak and a minimum peak value Min Peak in the pitch rate variation graph, respectively, to use determined results for suitable control according to an expected behavior of the vehicle to travel over the speed bump 5. That is, such difference values may be used for control of the entire behavior of the vehicle.

As described above, the behavior estimation and determination unit 300 may estimate a behavior of the vehicle by determining physical quantities (for example, impulse and pitch rate) associated with traveling of the vehicle on the road surface, the profile of which has been determined in the road surface profile determination unit 200.

The behavior information recording unit 400 may record and store information as to behaviors of the vehicle respectively expected when the vehicle travels on various kinds of road surfaces. For example, the behavior information recording unit 400 may quantify expected vehicle behaviors according to various kinds of speed bumps and various vehicle speeds through real vehicle experiments or simulations, and may record quantified results. That is, the behavior information recording unit 400 may construct a database according to expected vehicle behaviors.

Figure 6:
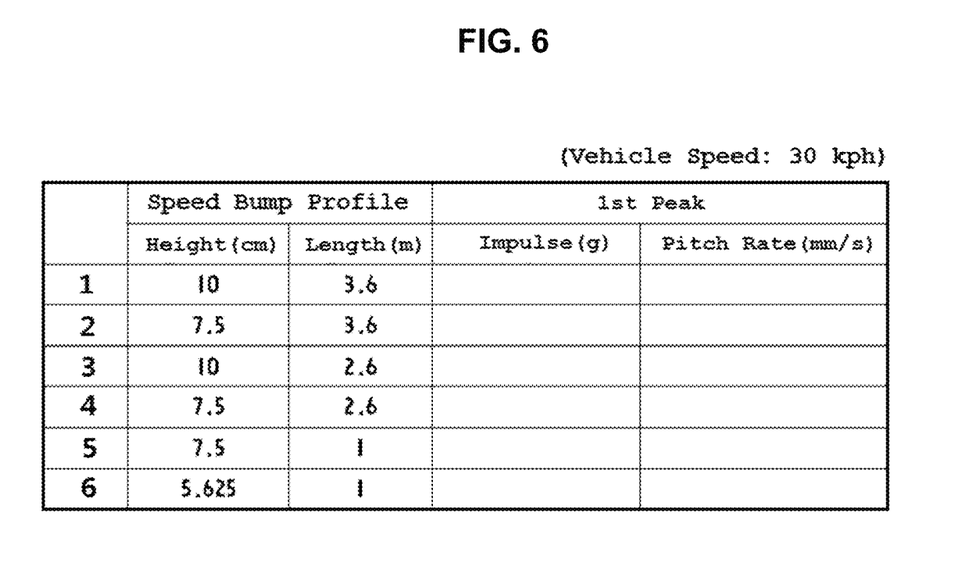
FIG. 6 is a table illustrating vehicle behaviors according to various kinds of speed bumps as an example of data recorded by a behavior information recording unit.

FIG. 6 is a table illustrating vehicle behaviors according to various kinds of speed bumps as an example of data recorded by the behavior information recording unit 400.

The table shown in FIG. 6 represents data of vehicle behaviors exhibited in cases of a total of six speed bumps on the basis of actual installation statuses on roads and a guideline for management of road safety facilities. For reference, the vehicle behaviors are exhibited at a vehicle speed of 30 kph, and only six speed bump profiles selected from a total of 50 speed bump profiles are illustrated, for simplicity of explanation.

As described above, the behavior information recording unit 400 previously stores, in a form of impulse and pitch rate data), information as to vehicle behaviors exhibited in accordance with various vehicle speeds (not only the above-described vehicle speed of 30 kph, but also vehicle speeds of 40 kph, 50 kph, 60 kph, etc.) in association with various kinds of speed bumps. That is, the behavior information recording unit 400 may construct an expected vehicle behavior map according to various kinds of speed bumps having different heights, different lengths and different other factors, and various vehicle speeds.

Meanwhile, for a speed bump, information related to which is not stored in the behavior information recording unit 400, that is, an unknown speed bump different from the predetermined kinds of speed bumps, determined results from the behavior estimation and determination unit 300 may be used. For example, even when there is a speed bump, information related to which is not stored in the behavior information recording unit 400, that is, an unknown speed bump different from the predetermined kinds of speed bumps, the behavior information recording unit 400 may compute determined results obtained from the behavior estimation and determination unit 300 in association with the speed bump, using various algorithms of the behavior estimation and determination unit 300 such as numerical determination, interpolation, etc., and may store determined results.

Accordingly, the behavior information recording unit 400 may store, in a form of data, impulses and pitch rates according to heights and lengths of various speed bumps at various vehicle speeds, and may then use the stored data as materials for estimating a behavior of the vehicle.

The behavior determination and control unit 500 compares an estimation value obtained through determination of the behavior estimation and determination unit 300 with recorded values stored in the behavior information recording unit 400, determining a level corresponding to the behavior of the vehicle. The behavior determination and control unit 500 may then send results of the determination to the ECS control unit 700 to enable the ECS control unit 700 to execute suitable suspension control according to the determined level.

There may be a plurality of levels in association with vehicle behaviors. For example, vehicle behavior levels may be categorized into a total of 9 levels Lv in accordance with a combination of 3 impulse levels and 3 pitch rate levels. In the instant case, level 1 is the case in which both the impulse and the pitch rate are minimum, and level 9 is the case in which both the impulse and the pitch rate are maximum. of course, the number of vehicle behavior levels is not limited to 9, and various numbers of vehicle behavior levels may be used.

Accordingly, the behavior determination and control unit 500 compares an estimation value obtained by the behavior estimation and determination unit 300 with recorded values stored in the behavior information recording unit 400, determining a level corresponding to data equal to or approximate to the estimation value as a vehicle behavior level.

Results of the vehicle behavior level determination are sent to the ECS control unit 700 which, in turn, may execute suspension control for the ECS while controlling the actuator 800.

The suspension control executed by the ECS control unit 700 in accordance with operation of the behavior determination and control unit 500 may be referred to as a "first control logic" because the suspension control may be preferentially executed in accordance with previous observation of road surface conditions. The first control logic determines the road surface recognized by the camera 110 as a reference speed bump 5. In the instant case, the first control logic previously inputs a parameter corresponding to a vehicle behavior most similar to a behavior of the vehicle to be exhibited due to the speed bump 5, before the vehicle reaches the speed bump 5, and executes a control operation, based on the input parameter. Alternatively, the first control logic determines the road surface recognized by the camera 110 as a reference pot-hole 6. In the instant case, the first control logic previously inputs a parameter corresponding to a vehicle behavior most similar to a behavior of the vehicle to be exhibited due to the pot-hole 6, before the vehicle reaches the pot-hole 6, and executes a control operation, based on the input parameter.

When the above-described first logic is not used, general ECS control may be executed. The general ECS control may be referred to as a "second control logic".

The vehicle signal determination unit 600 may determine vehicle signals for execution of the second control logic. For example, the vehicle signals may include body acceleration, wheel acceleration, a steering angle, vehicle speed, brake pressure, TQI, travel mode, etc.

The vehicle signal determination unit 600 collects the above-described vehicle signals, and sends the collected vehicle signals to the ECS control unit 700 which, in turn, executes ECS control.

The ECS control unit 700 may determine road surface roughness in accordance with the above-described vehicle signals, and may generate a command for controlling ride comfort through skyhook control. Furthermore, the ECS control unit 700 may execute adaptive control such as anti-roll, anti-drive, anti-squat, or the like.

The ECS control unit 700 may execute suspension control for the ECS while controlling the actuator 800 in accordance with the vehicle signals obtained from the vehicle signal determination unit 600. Control parameters obtained by the vehicle signal determination unit 600 conform to a general ECS control method, and may be referred to as "second control parameters".

The ECS control unit 700 may also function as a coordinator for determining which control command may be preferentially executed, that is, order of control preference. That is, the ECS control unit 700 may execute the general ECS control, based on result values from the vehicle signal determination unit 600 (second control). On the other hand, when result values from the road surface recognition unit 100 are present, the ECS control unit 700 may execute a suspension control, based on result values from the behavior determination and control unit 500 (first control).

The ECS control unit 700 may have a second control parameter corresponding to result values from the vehicle signal determination unit 600. Furthermore, the ECS control unit 700 may receive results of vehicle behavior level determination from the behavior determination and control unit 500, and may control the actuator 800, based on a first control parameter meeting the received results.

In an exemplary embodiment of the present invention, result values from the behavior determination and control unit 500 may be categorized into a plurality of levels. For example, when result values from the behavior determination and control unit 500 are categorized into 9 levels, a total of 9 control parameters may be prepared. In the instant case, the 9 control parameters may be predetermined to enable execution of suspension control meeting an expected vehicle behavior. The 9 control parameters may correspond to control modes 0 to 9, respectively.

FIG. 7, FIG. 8A, FIG. 8B and FIG. 8C, and FIG. 9 illustrate test results showing, by vehicle travel sections, operation of the ECS control system of the vehicle using road surface information according to the illustrated exemplary embodiment of the present invention.

Hereinafter, operation of the ECS control system of the vehicle using road surface information including the above-described components will be described with reference to FIGS. 7 to 9.

Figure 7:
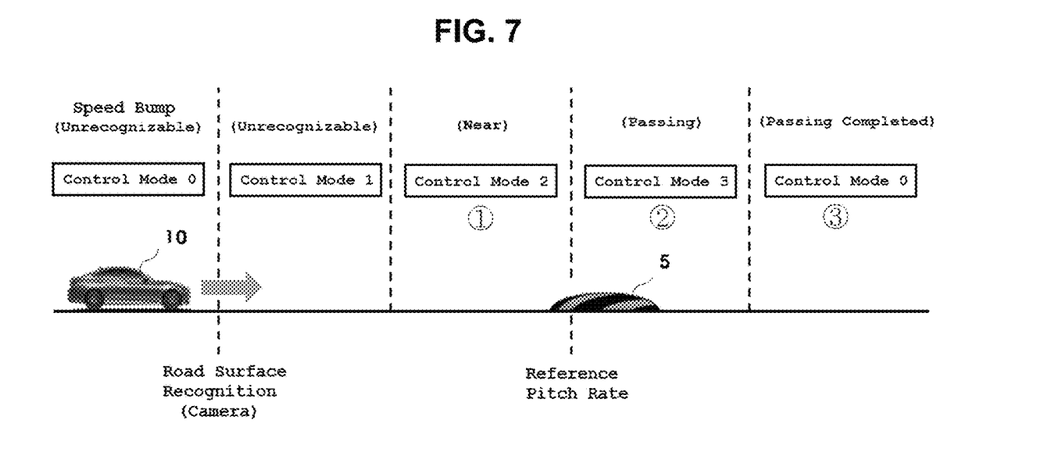
FIG. 7, FIG. 8A, FIG. 8B, FIG. 8C and FIG. 9 illustrate test results showing, by vehicle travel sections, operation of the ECS control system of the vehicle using road surface information according to the illustrated exemplary embodiment of the present invention.

When the vehicle travels on a road surface having a speed bump 5 positioned in front thereof, as illustrated in FIG. 7, the road surface recognition unit 100 (for example, the camera 110) cannot recognize the speed bump 5 at a position far from the speed bump 5. This travel section is a section where the speed bump 5 cannot be recognized. In the instant case, the ECS control unit 700 may execute a suspension control using a parameter corresponding to control mode 0. Control mode 0 may be a parameter used in the second control logic.

When the road surface recognition unit 100 approaches a position where the road surface recognition unit 100 is spaced from the speed bump 5 by a distance that the road surface recognition unit 100 can recognize the speed bump 5, the present travel section is a section where the speed bump 5 is recognizable. In the present travel section, the ECS control unit 700 may execute a suspension control using a parameter corresponding to control mode 1. Similarly to control mode 0, control mode 1 may be a parameter used in the second control logic.

When the vehicle reaches a position near the speed bump 5, the present travel section is a section ① where the vehicle is positioned near the speed bump 5. In the section ①, the ECS control unit 700 may execute suspension control using a parameter corresponding to control mode 2. Control mode 2 may be a parameter used in the first control logic.

When the vehicle is passing through a section ② where the vehicle travels over the speed bump 5, the ECS control unit 700 may execute a suspension control using a parameter corresponding to control mode 3. Control mode 3 may be a parameter used in the first control logic.

When the vehicle reaches a section ③ where travel of the vehicle over the speed bump 5 has been completed, the ECS control unit 700 may again execute suspension control using the parameter of control mode 0.

Figure 8A:
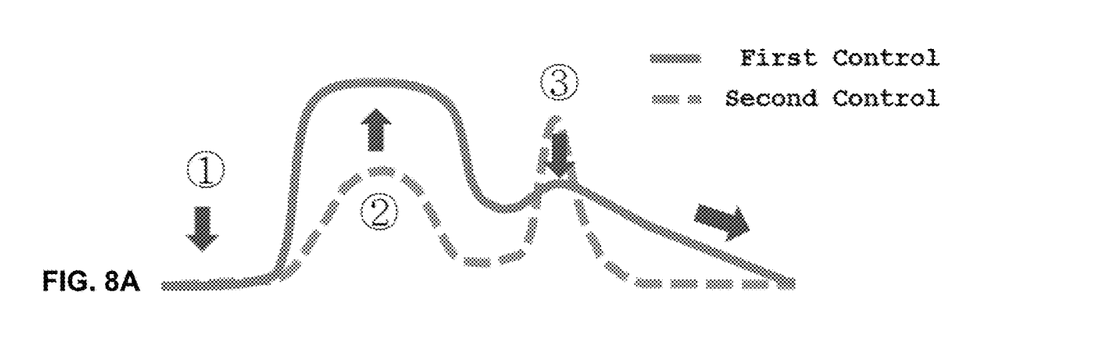

FIG. 8A is a graph showing attenuation control according to travel sections associated with the speed bump 5. FIG. 8B is a graph showing motion of the vehicle (vehicle body). FIG. 8C shows a road surface where the speed bump 5 is disposed.

Figures 8B, 8C:
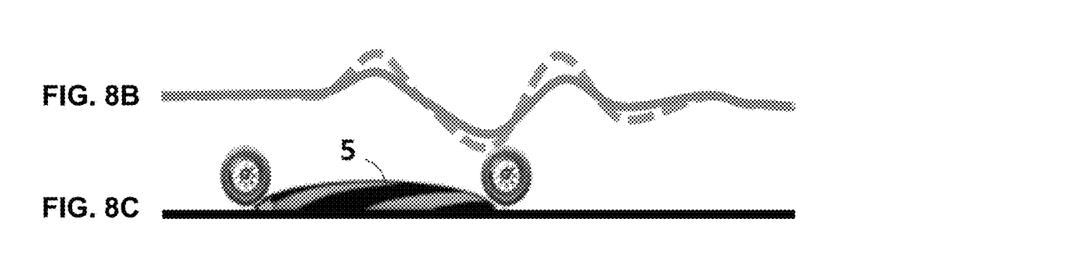
Figure 9:
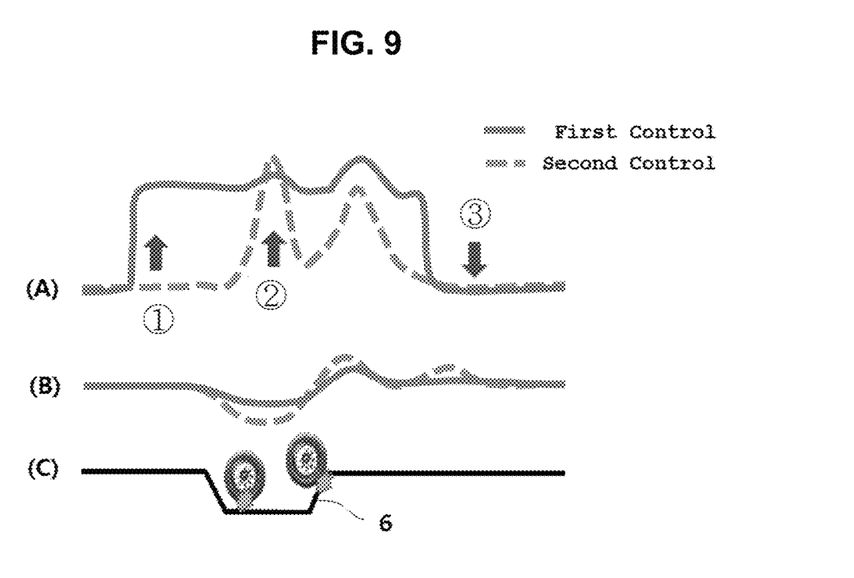

FIG. 8A, FIG. 8B and FIG. 8C show differences between the case in which the vehicle executes the first control in the section ① where the vehicle is positioned near the speed bump 5, the section ② where the vehicle travels over the speed bump 5, and the section ③ where travel of the vehicle over the speed bump 5 has been completed and the case in which the vehicle executes ECS control (conventional case) in sections ①, ②, and ③.

That is, when the vehicle travels over the speed bump 5, the first control logic is executed and then, it may be possible to control the suspension while rapidly coping with conditions of the road surface on which the vehicle will travel. Accordingly, it may be seen that reduced pitch motion and reduced aftershock are exhibited, as compared to the second control logic. Even in the case of the pot-hole 6 shown in FIG. 9, similar results to the above-described case may be obtained.

Thus, in accordance with the ECS control system 1 of the vehicle using road surface information according to an exemplary embodiment of the present invention, it may be possible to achieve road surface recognition through the camera 110, which may recognize the height of a road surface positioned in front thereof, to determine a behavior of the vehicle as an expected vehicle behavior according to the recognized front road surface, and to control the suspension using a parameter suitable for the expected vehicle behavior. Accordingly, effects of vehicle motion reduction and impact reduction may be obtained.

Figure 10:
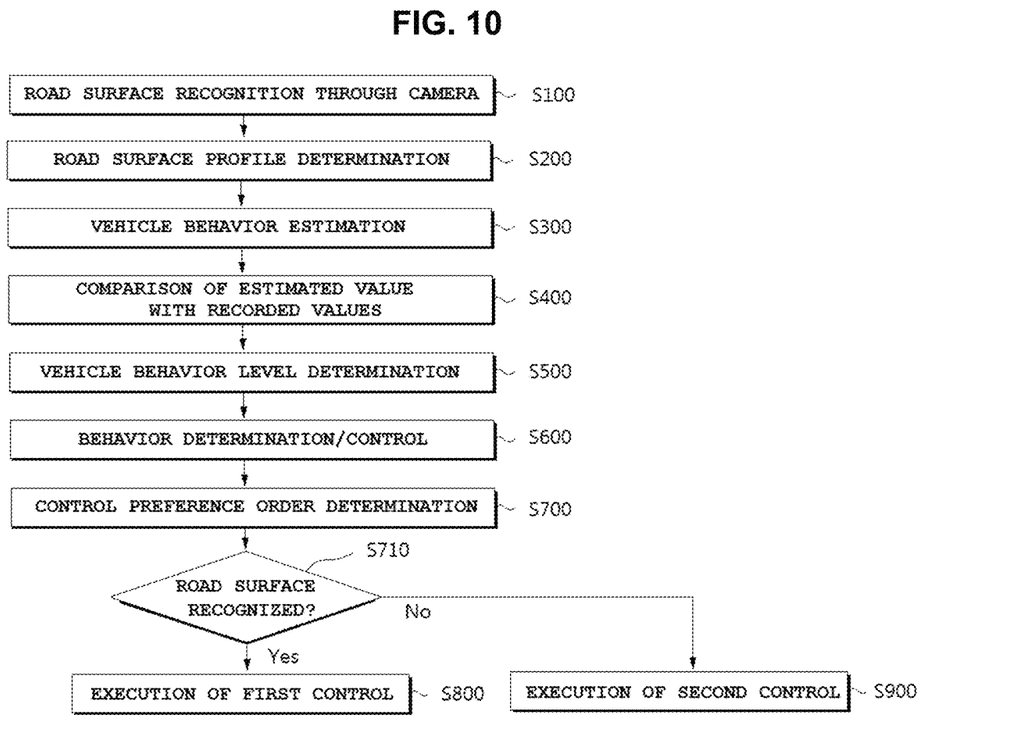
FIG. 10 is a flowchart illustrating a method for controlling the electronically controlled suspension control system using road surface information in accordance with various exemplary embodiments of the present invention.

FIG. 10 is a flowchart illustrating a method for controlling the ECS control system using road surface information in accordance with various exemplary embodiments of the present invention.

Hereinafter, the method for controlling the ECS control system using road surface information in accordance with the illustrated exemplary embodiment will be described with reference to FIG. 10 and the above-described drawings.

First, road surface recognition for recognizing a road surface positioned in front of the vehicle is executed (S100). In operation S100, the road surface may be recognized through the camera 110 or the navigation terminal 120 mounted to the vehicle.

Thereafter, road surface profile determination S200 for determining a road surface profile using information as to the road surface recognized in the road surface recognition S100 is executed (S200). For example, in the road surface profile determination S200, the profile of the road surface may be determined in accordance with the height, length, etc. of a speed bump 5 included in the road surface.

Subsequently, vehicle behavior estimation S300 is executed. In the vehicle behavior estimation S300, the behavior estimation and determination unit 300 estimates vehicle behavior according to the profile of the road surface determined in the road surface profile determination S200. Although a variety of information may be used in estimation of vehicle behavior, impulse and pitch rate may be representatively used.

Various impulses and various pitch rates associated with various speed bump profiles are stored, as recorded values, in the behavior information recording unit 400. In behavior comparison S400, an estimated value obtained in the vehicle behavior estimation S300 is compared with recorded values of the behavior information recording unit 400.

In the instant case, the behavior level of the vehicle may be determined based on results from the behavior comparison S400 (S500). For example, the vehicle behavior level may be categorized into 9 levels Lv. In behavior level determination S500, a reference vehicle behavior may be determined through seeking of an estimation value similar to one of the recorded values stored in the behavior information recording unit 400.

In the instant case, the vehicle behavior level may be a plurality of behavior levels, for example, 9 behavior levels, as described above. Control commands according to the 9 behavior levels may include 9 control parameters, respectively.

In behavior determination and control S600, a control command meeting the determined behavior level may be sent. In the behavior determination and control S600, the control command is sent to the ECS controller 700 to control the suspension of the vehicle through application of a control parameter meeting the reference vehicle behavior.

After execution of the behavior determination and control S600, control preference order determination S700, that is, coordinator operation, may further be executed. In the coordinator operation S700, order of control preference is determined in accordance with result values from vehicle signal determination (e.g., the vehicle signal determination unit 600 of FIG. 1) and the behavior determination control S600.

In the coordinator operation S700, whether or not there is road surface recognition in the road surface recognition S100 may be determined (S710). When there is road surface recognition, a first control parameter according to the result value of the behavior determination control S600 may be preferentially executed (first control) (S800). When there is no road surface recognition, a second control parameter may be executed (second control) (S900).

As apparent from the above description, in accordance with the ECS control system of the vehicle using road surface information according to an exemplary embodiment of the present invention, it may be possible to achieve road surface recognition through the road surface recognition unit, which may recognize the height of a road surface positioned in front thereof, to determine a behavior of the vehicle as an expected vehicle behavior according to the recognized front road surface, and to previously control the suspension using a parameter suitable for the expected vehicle behavior. Accordingly, effects of vehicle motion reduction and impact reduction may be obtained.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electronically controlled suspension control system of a vehicle, the electronically controlled suspension control system comprising:
    a road surface recognition unit configured to recognize a road surface disposed in front of the vehicle;
    a road surface profile determination unit configured to determine a profile of the road surface using information as to the road surface recognized by the road surface recognition unit;
    a behavior estimation and determination unit configured to estimate and determine a value of behavior of the vehicle according to the profile of the road surface determined by the road surface profile determination unit;
    a behavior information recording unit configured to pre-store information as to values of behaviors of the vehicle;
    an electronically controlled suspension (ECS) control unit configured to control a suspension of the vehicle; and
    a behavior determination and control unit connected to the behavior estimation and determination unit, the behavior information recording unit and the electronically controlled suspension (ECS) control unit,
    wherein the behavior determination and control unit is configured to compare a determined value from the behavior estimation and determination unit with pre-stored values of the behavior information recording unit, and configured to determine a behavior level of the vehicle, based on results of the comparison, and to send a control command according to a determined behavior level to the ECS control unit to control the suspension of the vehicle, and
    wherein the behavior information recording unit stores impulses and pitch rates according to different vehicle speeds through real vehicle experiments or simulations, in association with expected vehicle behaviors according to predetermined kinds of speed bumps.

2. The electronically controlled suspension control system according to claim 1,
    wherein the road surface recognition unit includes at least one of a camera and a navigation terminal.

3. The electronically controlled suspension control system according to claim 2,
    wherein the road recognition unit recognizes heights, lengths and curvatures of a speed bump and a pot-hole disposed at the road surface, a height of the road surface, a length of the road surface, and a curvature of the road surface.

4. The electronically controlled suspension control system according to claim 3,
    wherein the road surface profile determination unit determines the profile of the road surface, based on a length of the speed bump and a height of the speed bump.

5. The electronically controlled suspension control system according to claim 1,
    wherein the behavior estimation and determination unit estimates the behavior of the vehicle, based on at least one of an impulse, a bounce rate, a pitch rate, and a yaw rate.

6. The electronically controlled suspension control system according to claim 5,
    wherein the behavior estimation and determination unit determines the impulse and the pitch rate in accordance with the profile of the road surface, estimating the behavior of the vehicle.

7. The electronically controlled suspension control system according to claim 5,
    wherein the behavior estimation and determination unit estimates the behavior of the vehicle, based on at least one of a first peak value, a maximum peak value, a minimum peak value, and a difference value between the maximum peak value and the minimum peak value in each of the impulse and the pitch rate.

8. The electronically controlled suspension control system according to claim 7,
    wherein the first peak value is used for control of a first impulse,
    wherein the maximum peak value is used for reduction control of a maximum impulse, and
    wherein the difference value is used for behavior control of the vehicle.

9. The electronically controlled suspension control system according to claim 6,
    wherein the behavior information recording unit determines an impulse and a pitch rate associated with a speed bump different from the predetermined kinds of speed bumps, using at least one of numerical determination and interpolation.

10. The electronically controlled suspension control system according to claim 9,
    wherein the behavior determination and control unit categorizes the behavior level of the vehicle into a plurality of behavior levels.

11. The electronically controlled suspension control system according to claim 10,
    wherein the behavior level of the vehicle is determined in accordance with a plurality of impulse level ranges and a plurality of pitch rate level ranges.

12. The electronically controlled suspension control system according to claim 1, further including:
    a vehicle signal determination unit configured to determine vehicle signal information, and to send the determined vehicle signal information to the ECS control unit,
    wherein the behavior determination and control unit determines that an electronically controlled suspension (ECS) control of the suspension in the vehicle is required to be executed, based on a result value from the vehicle signal determination unit, when there is no road surface recognized by the road surface recognition unit.

13. The electronically controlled suspension control system according to claim 1,
wherein the ECS control unit has a plurality of control parameters respectively corresponding to result values of the behavior determination and control unit.

14. The electronically controlled suspension control system according to claim 1,
wherein the ECS control unit has control parameters respectively corresponding to result values of the vehicle signal determination unit.

15. A method for controlling an electronically controlled suspension control system of a vehicle, the method comprising:
recognizing a road surface disposed in front of the vehicle;
determining a profile of the road surface, using information as to the recognized road surface;
estimating a behavior of the vehicle according to the determined profile of the road surface;
comparing an estimated value obtained in estimating the behavior of the vehicle with pre-stored values in a behavior information recording unit; and
determining a behavior level of the vehicle, based on results of the behavior comparison, and sending a control command according to the determined behavior level,
wherein the behavior information recording unit stores impulses and pitch rates according to different vehicle speeds through real vehicle experiments or simulations, in association with expected vehicle behaviors according to predetermined kinds of speed bumps.

16. The method according to claim 15,
wherein the comparing includes seeking an estimation value corresponding to at least one of the pre-stored values, and determines a reference vehicle behavior, based on the estimation value.

17. The method according to claim 16,
wherein the determining and sending includes controlling a suspension of the vehicle through application of a control parameter meeting the reference vehicle behavior.

18. The method according to claim 17,
wherein the behavior level of the vehicle is categorized into a plurality of behavior levels; and
wherein the control command includes a plurality of control parameters respectively according to the plurality of behavior levels.

19. The method according to claim 18, further including:
determining an order of control preference according to the determined behavior level.

20. The method according to claim 19, further including:
executing a control of the suspension in the vehicle when the road surface is recognized.

21. The method according to claim 19, further including:
executing an electronically controlled suspension (ECS) control of the suspension in the vehicle when no road surface is recognized.

* * * * *